US009229583B2

(12) United States Patent
Spears (10) Patent No.: US 9,229,583 B2
(45) Date of Patent: Jan. 5, 2016

(54) OBJECT LOCATION DETERMINATION INCLUDING WRITING PRESSURE INFORMATION OF A STYLUS

(71) Applicant: 1 OAK TECHNOLOGIES, LLC, Fort Collins, CO (US)

(72) Inventor: Kurt E Spears, Fort Collins, CO (US)

(73) Assignee: OTTER PRODUCTS, LLC, Fort Collins, CO (US)

( * ) Notice: Subject to any disclaimer, the term of this patent is extended or adjusted under 35 U.S.C. 154(b) by 322 days.

(21) Appl. No.: 13/904,096

(22) Filed: May 29, 2013

(65) Prior Publication Data

US 2014/0353467 A1 Dec. 4, 2014

(51) Int. Cl.
*G06F 3/042* (2006.01)
*G06F 3/041* (2006.01)

(52) U.S. Cl.
CPC ............ *G06F 3/0423* (2013.01); *G06F 3/0418* (2013.01)

(58) Field of Classification Search
CPC ......... G06F 3/0423; G06F 3/01; G06F 3/017; G06F 3/03; G06F 3/0304; G06F 3/03545; G06F 3/03547; G06F 3/0416; G06F 3/042; G06F 3/0421; G06F 3/0425; G06F 3/046; A63F 13/04; A63F 13/20; A63F 13/21; A63F 13/213; A63F 13/214; A63F 13/2145
USPC ........... 250/206.2, 206.1, 216, 221, 234, 236, 250/227.13
See application file for complete search history.

(56) References Cited

U.S. PATENT DOCUMENTS

| | | | |
|---|---|---|---|
| 3,184,847 A | 5/1965 | Rosen | |
| 3,613,066 A | 10/1971 | Cooreman | |
| 4,294,543 A | 10/1981 | Apple et al. | |
| 4,420,261 A | 12/1983 | Barlow et al. | |
| 4,553,842 A | 11/1985 | Griffin | |
| 4,558,313 A | 12/1985 | Garwin et al. | |
| 4,642,422 A | 2/1987 | Garwin et al. | |
| 4,688,933 A | 8/1987 | Lapeyre | |
| 5,196,835 A | 3/1993 | Blue et al. | |
| 5,231,381 A | 7/1993 | Duwaer | |
| 5,248,856 A * | 9/1993 | Mallicoat | 178/18.09 |
| 5,365,461 A | 11/1994 | Stein et al. | |
| 5,502,568 A | 3/1996 | Ogawa et al. | |
| 5,734,375 A | 3/1998 | Knox et al. | |
| 6,091,405 A | 7/2000 | Lowe et al. | |
| 6,362,468 B1 | 3/2002 | Murakami et al. | |
| 6,437,314 B1 | 8/2002 | Usuda et al. | |
| 6,480,187 B1 | 11/2002 | Sano et al. | |
| 6,522,395 B1 | 2/2003 | Bamji et al. | |
| 6,603,464 B1 | 8/2003 | Rabin | |
| 6,816,537 B2 | 11/2004 | Liess | |
| 6,906,702 B1 * | 6/2005 | Tanaka et al. | 345/175 |

(Continued)

*Primary Examiner* — Que T Le (57) ABSTRACT

A system for determining a location of an object on a planar surface includes a time-of-flight sensor having sensing elements that provide a field of view for the time-of-flight sensor. The system also includes a mirror attached to the shaft of a motor for reflecting the field of view of the time-of-flight sensor across the planar surface. The system also includes electrical circuitry configured to receive range images from the time-of-flight sensor as the field of view is swept across the planar surface and process the range images to identify the object in at least one of the range images. The electrical circuitry is also configured to calculate a location of the object on the planar surface relative to the motor based on an angle of the shaft associated with the at least one range image and based on a distance of the object from time-of-flight sensor.

16 Claims, 9 Drawing Sheets

(56) References Cited

U.S. PATENT DOCUMENTS

| | | |
|---|---|---|
| 7,050,048 B2 | 5/2006 | Ito |
| 7,532,206 B2 | 5/2009 | Morrison et al. |
| 8,009,152 B2 | 8/2011 | Kim et al. |
| 8,035,612 B2 | 10/2011 | Bell et al. |
| 8,355,012 B2 | 1/2013 | Chen et al. |
| 8,373,657 B2 | 2/2013 | Hildreth |
| 8,390,718 B2 | 3/2013 | Robinson et al. |
| 8,558,804 B2 | 10/2013 | Chen |
| 8,619,061 B2 | 12/2013 | Yen et al. |
| 8,723,789 B1 | 5/2014 | Rafii |
| 8,797,446 B2 | 8/2014 | Chou |
| 2001/0022579 A1 | 9/2001 | Hirabayashi |
| 2002/0015159 A1 | 2/2002 | Hashimoto |
| 2003/0071858 A1 | 4/2003 | Morohoshi |
| 2006/0007123 A1 | 1/2006 | Wilson et al. |
| 2006/0028442 A1 | 2/2006 | Bynum et al. |
| 2006/0132459 A1 | 6/2006 | Huddleston et al. |
| 2006/0202974 A1 | 9/2006 | Thielman |
| 2008/0062149 A1 | 3/2008 | Baruk |
| 2008/0259053 A1 | 10/2008 | Newton |
| 2009/0276734 A1 | 11/2009 | Taylor et al. |
| 2010/0066704 A1 | 3/2010 | Kasai |
| 2010/0085329 A1* | 4/2010 | Tseng et al. .................. 345/175 |
| 2010/0090986 A1 | 4/2010 | Wang |
| 2010/0295821 A1 | 11/2010 | Chang et al. |
| 2011/0043484 A1 | 2/2011 | Huang et al. |
| 2011/0051120 A1 | 3/2011 | Hartman et al. |
| 2011/0155479 A1 | 6/2011 | Oda et al. |
| 2011/0169775 A1* | 7/2011 | Liaw .................. G06F 3/03545 345/175 |
| 2011/0205340 A1 | 8/2011 | Garcia et al. |
| 2011/0291988 A1 | 12/2011 | Bamji et al. |
| 2012/0018625 A1* | 1/2012 | McCarthy et al. ............ 250/221 |
| 2012/0056807 A1 | 3/2012 | Chapman et al. |
| 2012/0062905 A1 | 3/2012 | Kiyose |
| 2012/0065914 A1 | 3/2012 | Kiyose |
| 2012/0098795 A1 | 4/2012 | Lu et al. |
| 2012/0120028 A1 | 5/2012 | Kiyose |
| 2012/0127124 A1 | 5/2012 | Zanone et al. |
| 2012/0293555 A1 | 11/2012 | Okano |
| 2015/0049063 A1 | 2/2015 | Smith et al. |

* cited by examiner

OBJECT LOCATION DETERMINATION INCLUDING WRITING PRESSURE INFORMATION OF A STYLUS

FIELD

The present application relates to systems, apparatuses, and methods for determining a location of an object on a planar surface.

BACKGROUND

Developments in technology have changed the way information is displayed and communicated to groups of people. Traditionally chalkboards and whiteboards have been used for these purposes. However, chalkboards and whiteboards have significant drawbacks. First, they cannot be easily integrated with electronic information displays. Second, they require specialized writing surfaces that are compatible with chalk, dry erase markers, or similar writing tools. Third, information written on these types of surface is not easily captured electronically for computerized processing or display. While some whiteboards have electronic scanning capability, these systems are typically costly for large whiteboards as the scanning mechanism must typically span the entire whiteboard or span an entire dimension of the whiteboard and be configured for controlled mechanical movement across the other dimension of the whiteboard.

Written information is also often electronically captured using an electronic touchpad that translates motion of a stylus, a user's finger, or another pointing device into electronic information. The information is typically captured relative to a position of the stylus, pointer, or finger on a surface or on a display screen. Touchpads are commonly integrated with or overlaid on a display screen, such as on a smartphone or tablet computer. Touchpads are also sometimes implemented in or on non-display surfaces such as on a digitizing tablet for computerized drafting system. A touchpad typically allows information to be electronically captured more efficiently than other methods as the user is not required to enter the information using a traditional input device such as a keyboard or a mouse. In addition, a touchpad enables the user to provide freehand or freeform written input.

Touchpads typically sense the user's actions using one of several methods including capacitive sensing, conductance sensing, and/or using a pressure sensitive membrane. Each of these methods requires that the display surface be overlaid with electrical and/or mechanical hardware which enables the surface to become touch sensitive. The cost of adding touch sensing capability to displays increases proportionally with the increasing area of the screen. In some cases, the increase in cost is more than proportional due to manufacturing yield issues associated with large areas. Consequently, touch input capabilities can be prohibitively expensive as display sizes increase. For this and other reasons, large numbers of displays are sold without touch input capability. It is desirable to add touch input capabilities to these displays in a cost effective manner. In addition, it may be desirable for a user to be able to provide written input using a stylus or finger on a surface other than on a surface of a display.

SUMMARY

A system for determining a location of an object on a planar surface is provided. The system includes a time-of-flight sensor having multiple sensing elements that provide a field of view for the time-of-flight sensor. The system also includes a motor having a rotating shaft and a mirror attached to the shaft for reflecting the field of view of the time-of-flight sensor across the planar surface such that the reflected field is about parallel to the planar surface and such that the reflected view is swept across the planar surface when the shaft is rotated. The system also includes electrical circuitry. The electrical circuitry is configured to receive range images from the time-of-flight sensor as the field of view is swept across the planar surface. Each range image includes information indicating detected distances associated with content of the range image. The electrical circuitry is also configured to process the range images to identify at least one of the range images that includes an image of the object. Finally, the electrical circuitry calculates a location of the object on the planar surface relative to the motor based on an angle of the shaft associated with the at least one range image and a distance of the object from time-of-flight sensor as indicated in the at least one range image.

Other techniques introduced herein also include other systems, apparatuses, and methods with various components. The techniques introduced here may also include non-transitory machine-readable storage media storing instructions that, when executed by one or more computer processors, direct the one or more computer processors to perform the methods, variations of the methods, or other operations described herein. While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

The disclosed techniques will be described and explained through the use of the accompanying drawings in which.

DETAILED DESCRIPTION

In the following detailed description, various specific details are set forth in order to provide an understanding of and describe the systems, apparatuses, and techniques introduced here. However, the systems, apparatuses, and techniques may be practiced without the specific details set forth in these examples. Various alternatives, modifications, and/or equivalents will be apparent to those skilled in the art without varying from the spirit of the introduced systems, apparatuses, and techniques. For example, while the examples described herein refer to particular features, the scope of this solution also includes techniques and implementations having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

Various types of electronic whiteboards and interactive displays have been developed to address the shortcomings of traditional whiteboards and chalkboards discussed above. Some of these systems use touchpads or touchscreens that span an entire display or writing area. While this approach has been widely accepted for devices such as smartphones and tablet computers having relatively small displays, touchscreens are a costly solution when a large display and/or writing area is desired. Other systems for capturing written information on a surface use a large number of sensors and/or mirrors placed around the periphery of the writing surface. This approach also has the disadvantage of being costly and is not easily adaptable to existing displays which do not have touch input capability. Other systems use one or more of various types of cameras which view the writing surface from a distance in order to capture the movements of a stylus or capture writing on the surface. In addition to requiring costly components, these systems require that some of the components be positioned a distance away from the writing surface at a location from which the writing surface can be viewed. This type of configuration requires additional space, often has more complex setup and configuration requirements, and requires a view of the writing surface that is not obstructed by users or objects.

Systems, apparatuses, methods, and techniques are introduced here that resolve the shortcomings discussed above. In one example, a system for determining a location of an object on a planar surface is provided. Advantageously, the cost of the components in the disclosed systems will typically be lower than in existing solutions and will require less physical space. In addition, the systems disclosed herein may be readily adapted to existing electronic display devices.

The examples and descriptions which follow use the term "write" and "writing" to describe motions a user makes with a stylus, finger, pointer, or other object. As used herein, the terms "write" or "writing" do not necessarily include making a physical mark on a surface or object. The "writing" may simply include physical motions which are electronically captured using the techniques described here. Using these techniques, "writing" may be performed without physically marking a surface, without using a device that is capable of physically marking a surface, and/or without using a surface that is capable of being physically marked. In addition, "writing" may represent information or communications other than words, letters, and numbers. "Writing" may include artistic representations, symbols, or other forms of information or communication that, using traditional methods, would be marked on some type of object or surface. In some examples, "writing" is electronically displayed on a display device as a representation of a physical mark even though no physical mark was made.

Furthermore, many of the techniques disclosed here are discussed in terms of determining a location of an object on a surface. It should be understood that writing or writing motion can be captured and approximated by determining successive locations of an object on a surface over a period of time. The successive locations represent a path of the object across the surface. The location of the object may be sampled periodically at a sufficient frequency, relative to the writing motion, to enable the writing to be approximated by interpolating the sampled data points.

Figure 1:
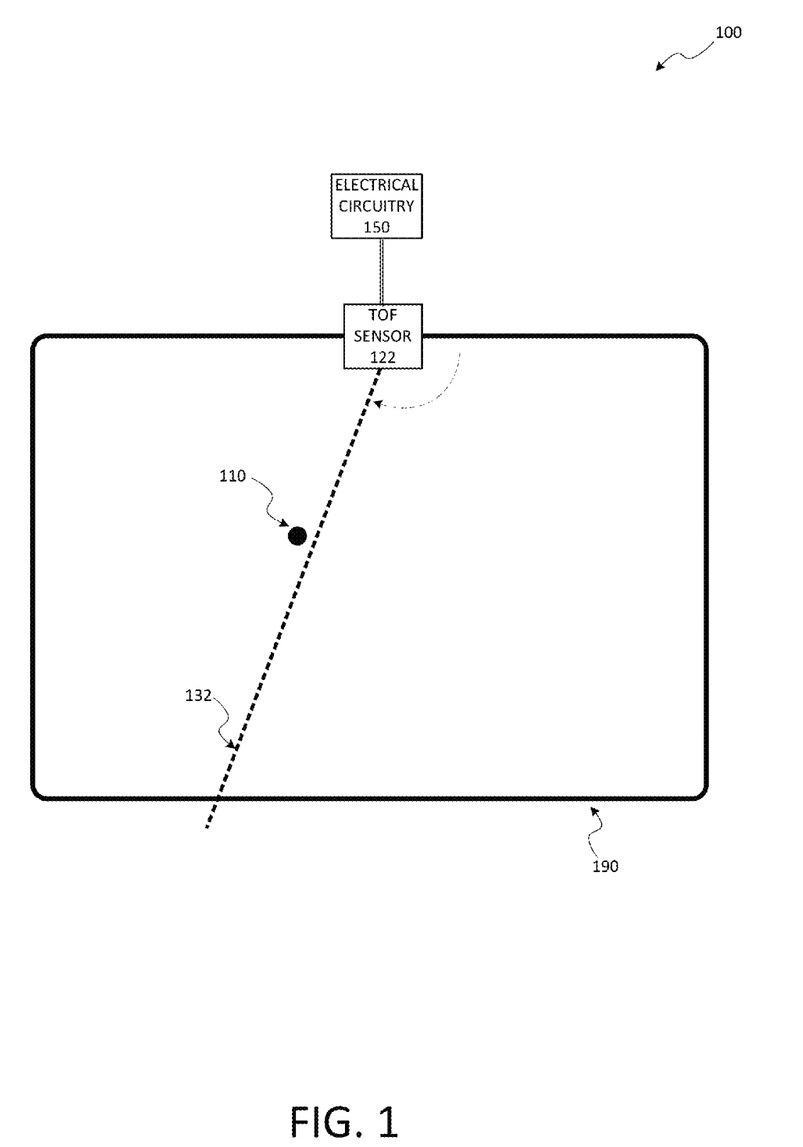
FIG. 1 illustrates a system for determining a location of an object on a planar surface.

FIG. 1 illustrates system 100 for determining a location of an object on a planar surface. System 100 includes time-of-flight (TOF) sensor 122 and electrical circuitry 150. Although system 100 is illustrated with respect to planar surface 190 and object 110, planar surface 190 and object 110 need not be components of system 100. System 100 may be operated with respect to any "writing" surface. In some cases, system 100 may be operated using a wall, a table, a floor, a surface of an electronic display, or another surface that may not be traditionally described as a writing surface.

Time-of-flight (TOF) sensor 122 may be a range imaging device. A range imaging device determines the distance of objects in its field of view based on the speed of light by measuring the TOF of an optical signal transmitted between a source associated with the sensor and the object(s) in the field of view of the sensor. The determination of distance is made for each of the multiple sensing elements which make up the range imaging device. In the example of FIG. 1, TOF sensor 122 captures range information for the area in its field of view and makes distance determinations for the entire field of view rather than determining point-by-point scanning with a beam such as in scanning lidar systems. TOF sensor 122 may be sensitive to electromagnetic energy in the visible, ultraviolet, and/or infrared spectrums. In some cases TOF sensor 122 may be a TOF camera.

Field of view 132 is the field of view of TOF sensor 122. Although field of view 132 is illustrated using a line in FIG. 1, field of view 132 will have a finite height and/or width that covers a specified area. The illustration of field of view 132 using a line in FIG. 1 is primarily intended to illustrate the direction of field of view 132. Field of view 132 may be conical and may expand to cover a larger area as the area of interest moves further from TOF sensor 122. Using methods known in the optical arts, various optical components may be used to focus, collimate, limit, shape, or otherwise change characteristics of field of view 132.

TOF sensor 122, or an associated device, may also include components for directing field of view 132 in various directions. Specifically, these other components may be configured for sweeping or panning field of view 132 across the surface of planar surface 190. One mechanical implementation for accomplishing the rotation of field of view 132 is illustrated and explained in the discussion associated with FIG. 5.

TOF sensor 122 is illustrated in FIG. 1 as being placed or attached on the top edge of planar surface 190. However, other orientations are possible. TOF sensor 122 may be placed along other edges of planar surface 190. Furthermore, TOF sensor 122 may be in contact with planar surface 190 or may be placed entirely within the perimeter of planar surface 190. Planar surface 190 may be a wall, a floor, a desktop, a surface of an electronic display, or any other surface that is planar. However, planar surface 190 need be entirely planar or smooth. It is only necessary that TOF sensor 122 have a view across the surface of planar surface 190 without being significantly obstructed by variations in planar surface 190 as is discussed in more detail below.

Electrical circuitry 150 contains electrical and/or electronic components for communicating with TOF sensor 122 and, in some cases, with other electrical devices. Electrical circuitry 150 may include digital components, analog components, electromechanical connections, or a combination thereof. In some cases, electrical circuitry 150 may include one or more computer processors, microcontrollers, digital signal processors, programmable logic arrays, and/or programmable logic. In some cases, electrical circuitry 150 may also contain firmware, software, and/or another type of machine-readable instruction that is executable by the electrical hardware. Electrical circuitry 150 may transmit data to TOF sensor 122 in addition to receiving data from TOF sensor 122. Electrical circuitry 150 may also include other communication capabilities, including the capability to communicate with other devices.

Object 110 is any object that a user may use to make pointing or writing motions on planar surface 190. Object 110 may be a finger, a stylus, a pointer, a pen, a marker, or another object having a tip or end discernible in images or image information captured by TOF sensor 122.

Various methods may be used to sweep or pan field of view 132 across planar surface 190. These methods may utilize electrical, mechanical, and/or optical components. Although FIG. 1 illustrates field of view 132 being swept in a clockwise direction, it may also be swept in a counter-clockwise direction. Field of view 132 may be swept through full 360 degree rotations or may sweep only through a smaller angular range of interest. Furthermore, a mechanism that rotates field of view 132 may travel through full 360 degree rotations while images are only captured by TOF sensor 122 for one or more portions of those rotations. The rotational ranges may be adjustable or configurable within system 100 based on the orientation of TOF sensor 122 to planar surface 190. For example, TOF sensor 122 may be located within a planar area such that the writing surface of interest encompasses TOF sensor 122. In some cases, field of view 132 may be shifted to different directions in a discontinuous or non-sequential order. In other words, the successive angles of field of view 132 may be non-continuous.

While field of view 132 is described as being panned or swept across planar surface 190, TOF sensor 122 may capture a series of images in discrete steps. The series of images is intended to, cumulatively, cover the entire area of the writing area of interest (e.g., planar surface 190 in FIG. 1) in order to capture any object(s) that may be anywhere in the area of interest. The discrete steps may be chosen based on a width of field of view 132 in order to provide the proper coverage. The width of field of view 132 may allow any particular image to contain an object even though it is not in the center of the field of view. For example, an image associated with field of view 132 in FIG. 1 may contain object 110 even though it is not at the center of field of view 132. In some cases, successive fields of view may overlap and object 110 may be contained within two or more of the images.

An angle of field of view 132 relative to TOF sensor 122 is known for and associated with each image captured by TOF sensor 122. When an image captured by TOF sensor 122 includes object 110, the distance information inherent in the TOF image captured by TOF sensor 122 and the associated angle of field of view 132 can be used to mathematically calculate a location of object 110 relative to TOF sensor 122. If TOF sensor 122 is in a known location with respect to planar surface 190, the approximate location of object 110 on planar surface 190 can then be determined.

In some cases, further processing may be performed to determine an approximate relative location of object 110 within a TOF image to determine the location of object 110 with greater precision. As described previously, a TOF image taken with field of view 132 may include object 110 even though object 110 is not in the center of field of view 132. Therefore, the location of object 110 in the TOF image may be used to make a more precise determination of the angle of the object relative to TOF sensor 122. For example, field of view 132 may be 135 degrees from a designated reference point, but the location of object 110 within the TOF image that was taken at the 135 degree field of view may mathematically indicate that the object is at approximately 136.3 degrees. In other words, the field of view may be known to span a specified number of degrees of view to either side of the angle recognized as being associated with the center of the field of view.

Using the techniques described here, a location of object 110 on planar surface can be determined relative to the location of TOF sensor 122. TOF sensor 122 does not need to be permanently attached to planar surface 190 and may be optionally moved between surfaces or may simply be set on a surface to be used with that surface. For example, TOF sensor 122 could be set on a floor and used to track locations of objects or footsteps on the floor. Successive locations of object 110 on the surface may be determined in order to identify a path of object 110 as it moves across the surface. The calculations described in the examples herein may be performed by electrical circuitry 150, may be performed by electrical circuitry associated with TOF sensor 122, or may be performed by a combination thereof. TOF sensor 122 may communicate with electrical circuitry 150 using wired or wireless communication methods.

Figure 2:
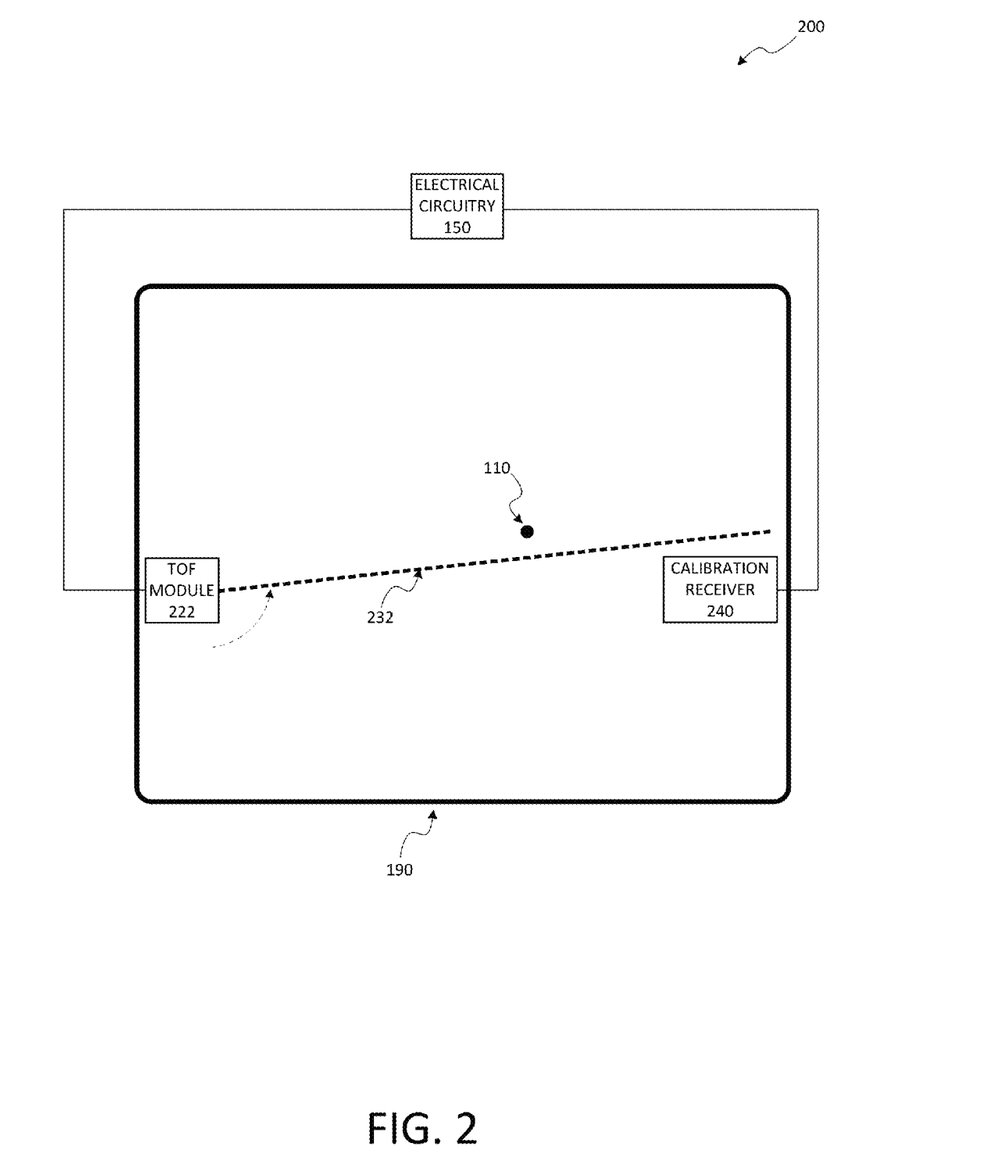
FIG. 2 illustrates a system for determining a location of an object on a planar surface.

FIG. 2 illustrates system 200 for determining a location of an object on planar surface 190. System 200 includes calibration receiver 240 and TOF module 222 having a field of view 232. TOF module 222 includes a TOF sensor, such as TOF sensor 122, and may also include additional components or circuitry for directing field of view 232, processing captured images, performing computations, and/or other functions. Calibration receiver 240 is any device, or group of devices, capable of detecting or receiving a signal from TOF module 222. Calibration receiver 240 has a known and fixed location with respect to TOF module 222. TOF module 222 has a field of view 232. TOF module 222 may also project a directional beam of energy, such as a beam of infrared light, in the same direction as field of view 232. When the directional energy beam is received at calibration receiver 240, this information is used to identify or reset a home location or zero degree angular position for field of view 232. In other words, calibration receiver 240 may be used to receive a directional signal from TOF module 222 to perform a physical measurement, correction, or zeroing of the angle of field of view 232 in order to reset or calibrate information about the tracked angle of field of view 232.

Performing the calibration function described above may be useful for maintaining the accuracy of system 200. Even if field of view 232 is rotated at a known speed, the speed may vary slightly over time and/or the start position of that rotation may not be known. Therefore, angular position information about field of view 232 stored in TOF module 222 and/or electrical circuitry 150 may be made more accurate using information received from calibration receiver 240. In one example, calibration receiver 240 may be a photodetector capable of detecting energy in a same wavelength as a directional energy beam produced by TOF module 222. This type of calibration or reset process may occur upon every rotation of field of view 232 or may occur less frequently.

In one variation, calibration receiver 240 may be a fixed reference object that can be uniquely recognized in images captured by TOF module 222. The images may be processed to determine when the reference object appears in the images such that the angle of field of view 232 can be calibrated with respect to the physical location of the reference object. The calibration process may also include calibrating distances indicated by TOF module 222 based on a known distance of calibration receiver 240 from TOF module 222.

System 200 operates similarly to system 100. TOF module 222 includes a TOF sensor having a field of view 232 that is rotated across planar surface 190 parallel, or nearly parallel, to planar surface 190 by TOF module 222. Electrical circuitry 150 is configured to receive range images from TOF module 222 as field of view 232 is swept across planar surface 190. The range images include information indicating detected distances associated with content of the range images. Electrical circuitry 150 is configured to process the range images to identify at least one of the range images that includes object 110. Electrical circuitry 150 then calculates a location object 110 on planar surface 190, relative to TOF module 222, based on a known angle of field of view 232 that is associated with the range image that includes object 110 and based on a distance of object 110 from TOF module 222 as indicated in the range image. In other words, the relative location of object 110 can be determined based on a known angle and distance from a fixed point, the location of TOF module 222.

While field of view 232 is described as being parallel to planar surface 190 it is not necessary that it be precisely parallel. In some cases, field of view 232 may be substantially parallel, primarily parallel, nearly parallel, or about parallel to planar surface 190 without being precisely parallel. It is only necessary that field of view 232 have a view across the surface of a surface area of interest. This may be accomplished even though field of view 232 is not precisely parallel to planar surface 190. Field of view 232 may fan out and either a centerline of the fanning field of view 232 or some other ray of field of view 232 may be about parallel to planar surface 190.

Figure 3:
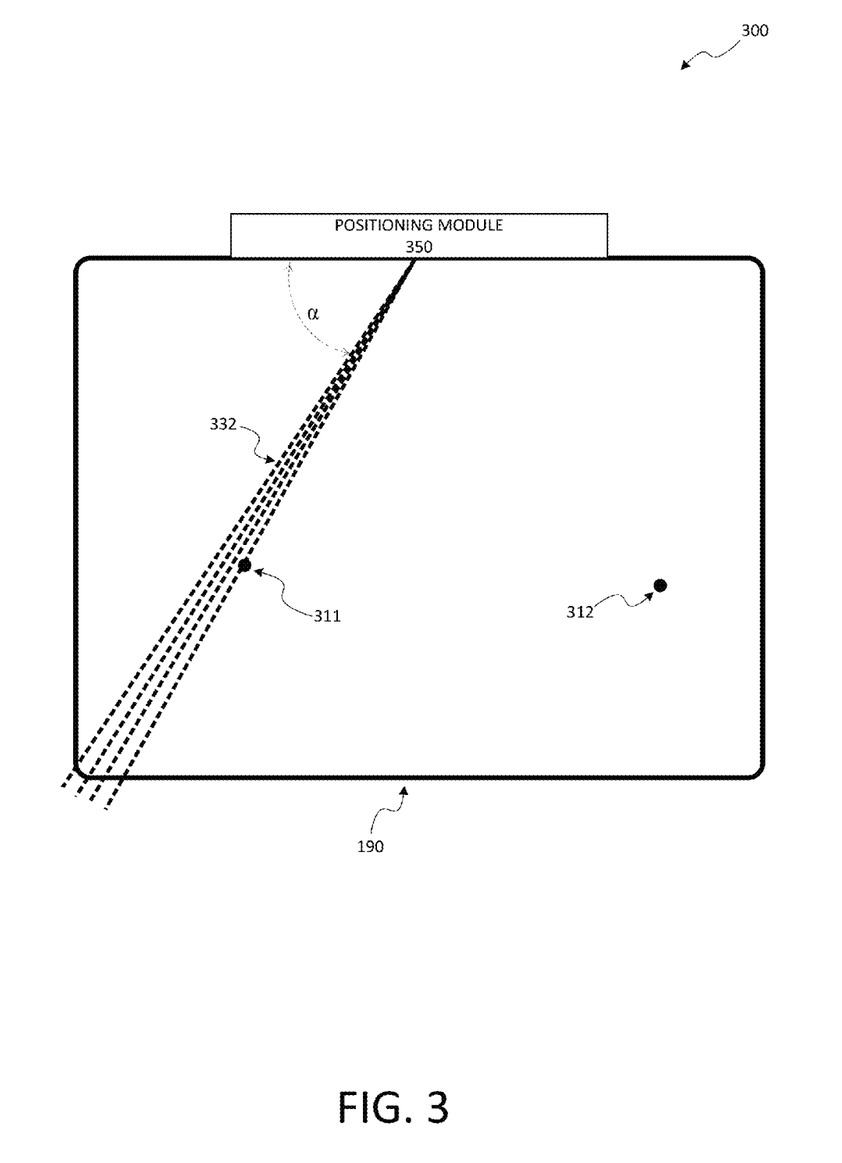
FIG. 3 illustrates a system for determining locations of two objects on a planar surface.

FIG. 3 illustrates system 300 for determining locations of two objects on planar surface 190. System 300 includes positioning module 350. Positioning module 350 includes a TOF device such as TOF sensor or TOF module 222. Positioning module 350 may also include a home position receiver or calibration point such as calibration receiver 240, as well as electrical or electronic circuitry for controlling the operation of these devices such as electrical circuitry 150. Positioning module 350 rotationally sweeps field of view 332 along planar surface 190 from a fixed location within positioning module 350. Field of view 332 is illustrated as fanning out slightly as the distance from positioning module 350 increases. This characteristic may also be present in field of view 132 and/or field of view 232 but is not illustrated in FIGS. 1 and 2 for purposes of clarity. Various optical components may be used to control how much field of view 332 fans and the fanning may be dynamically controlled by positioning module 350 based on an area of planar surface that is desired to be covered by positioning module 350.

Positioning module 350 operates similarly to components of system 100 and system 200 but provides the functions in an assembled package wherein the relative locations of the TOF sensor and any calibration components and their distance from each other are fixed, at least temporarily. These fixed relative locations and dimensions simplify mathematical computations associated with determining a location of object 312.

Positioning module 350 is capable of determining the location of two or more objects on planar surface 190, such as object 311 and 312. System 300 determines the locations of each of objects 311 and 312 using techniques similar to those described above with respect to FIGS. 2 and 3. In addition, positioning module 350 is capable of distinguishing between objects 311 and 312 such that the locations and movements of each can be separately determined. As discussed below, this distinguishing may occur in several different ways.

In one example, object 311 and object 312 have different physical appearances or characteristics. These different physical appearances or characteristics can be determined through image processing performed on images of the objects obtained by a TOF sensor in positioning module 350, such as TOF sensor 122. Objects 311 and 312 may be styluses having differently shaped tips or having different profiles such that they can be distinguished using the disclosed techniques.

In another example, objects 311 and 312 may be the fingers of different users who are writing on planar surface 190. An image sensor in positioning module 350, and associated image processing capabilities, may be capable of distinguishing between the fingers of different users based on physical differences such as finger size, finger structure, jewelry, and/or skin color. Alternately, or in addition, the users may wear specialized finger tips, thimbles, or unique rings that have different physical structures or characteristics that can be viewed and distinguished by positioning module 350.

In another example, objects 311 and 312 are styluses, or other types of pointers, that actively emit or transmit information enabling them to be distinguished by positioning module 350. This active transmission may include transmitting an optical signal or information, transmitting information using an infrared signal, transmitting a radio frequency (RF) signal, transmitting through a wired connection, or a combination thereof. Objects 311 and 312 may be distinguished by positioning module 350 based on the type of transmission and/or based on information included in the transmissions.

In the case that planar surface 190 is an electronic display device, the locations and/or movements of objects 311 and 312 may displayed on the electronic display in real-time, or near real-time, as the objects are moved on the surface. In some situations, the movement, path, or writing, of each of the objects may be displayed in a different color or displayed using some other distinguishing characteristic. This information may be displayed in addition to other information presented on the display, as discussed in examples that follow.

In the various examples provided herein, duplicating "writing" made by an object on a surface may also include determining when the object is actually in contact with the surface versus hovering slightly above the surface. Determining when the object is in contact with the surface may be important in generating electronic information that reflects the writing that a user of the object intended. Determining when the object is in contact with the surface, or sufficiently near the surface, may be accomplished using a number of different techniques as described below.

In one example, an imaging sensor, such as TOF sensor 122 or TOF module 222, has sufficient optical resolution to capture images that can be processed to determine whether an object is in contact with the surface. In the case of a deformable object, such as a finger tip of a user, this may be accomplished by successively processing images of the finger to detect a change in a shape of the tip of the finger as it is pressed against a surface. Other types of deformable objects or styluses are possible.

In another example, the object is a stylus containing a switch at its tip that is activated when the stylus is pressed against a surface. The stylus may transmit a signal to another component of the system indicating when the switch is or is not triggered. In another example, the stylus may contain a proximity sensor at its tip that indicates when the stylus is within a specified distance of a surface.

In yet another example, the object may be a stylus that contains a switch that is activated by the user. The operation of the stylus may be dependent upon the user activating the switch when the stylus is intended to be "writing." In this implementation, the stylus could be used without actually pressing it against a surface. In other words, the user could use the stylus to write in free space and use the switch to indicate when the stylus should be active and when it should not.

The stylus may also be configured to detect how hard a user is pressing the stylus against a surface. This information may be used in determining characteristics of the electronic representation of the user's writing. For example, when a user presses harder on the stylus, a line width of the electronically generated line may increase to visually represent that action. This may be accomplished in a number of ways. In one approach, the stylus may include a spring loaded tip that depresses in proportion to the amount of force applied to the stylus. A sensor, such as a hall effect sensor, may be used to detect how far the tip has been depressed into the stylus. Alternately, a strain gauge or other type of pressure sensor may be used to determine how much force is being applied to the stylus by the user.

Figure 4:
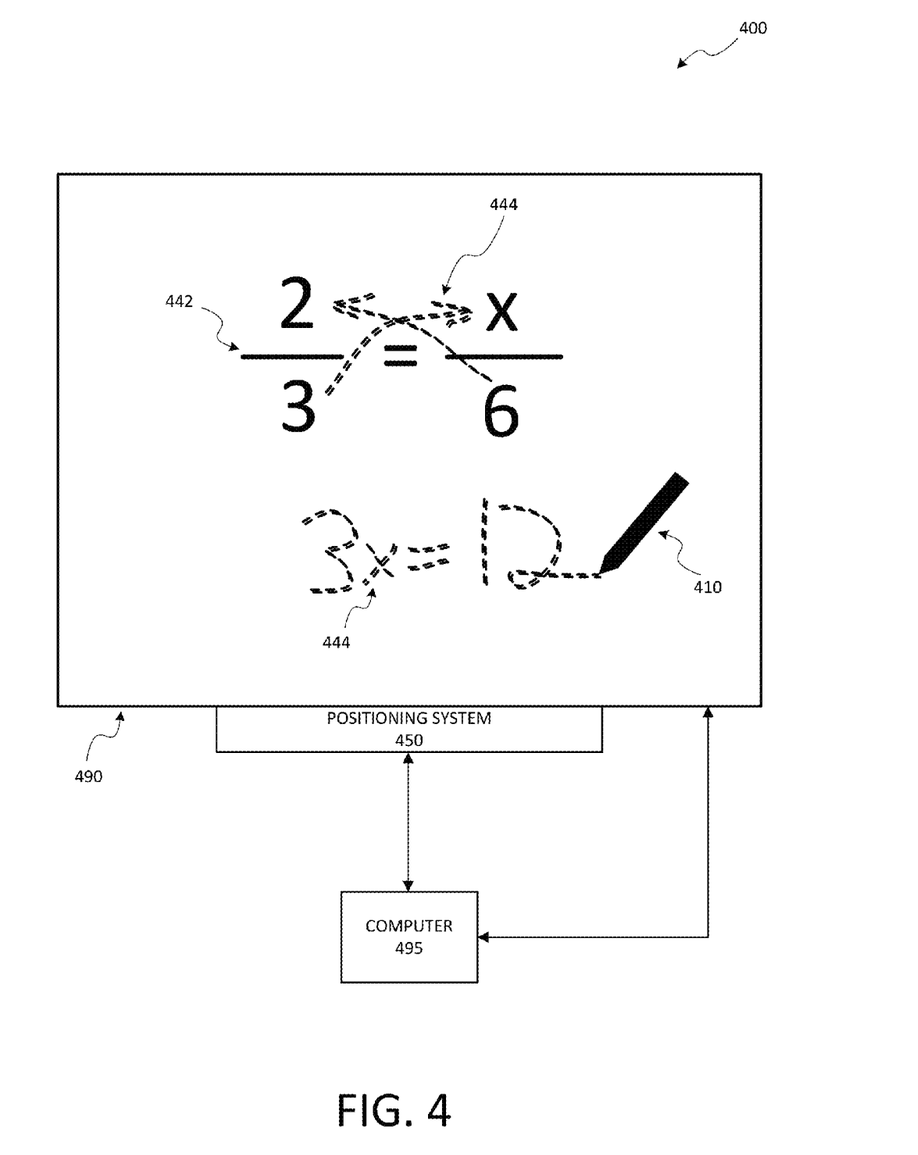
FIG. 4 illustrates operation of a virtual writing system with an electronic display.

FIG. 4 illustrates operation of a virtual writing system 400 with an electronic display 490. Electronic display 490 is any kind of information display device such as: a liquid crystal display (LCD), a plasma display, a cathode ray tube, an electrophoretic ink panel, and/or information projected on a surface by an electronic device, such as a projector. Display 490 does not include a touch sensitive screen or touch sensitive panel.

Computer 495 controls the information displayed on display 490. Computer 495 may be any type of computing device such as a desktop computer, a notebook computer, a tablet computer, a smartphone, a server, a virtual machine, an application specific integrated circuit (ASIC), a video display controller, an analog computer, a group of computing devices, or a combination thereof. In one example, computer 495 is a notebook computer and display 490 is an LCD display for displaying information to a group of people, such as students in a classroom. Computer 495 commands display 490 to display information such as text 442 (non-broken lines) using known methods.

Virtual writing system 400 includes positioning system 450. Positioning system 450 operates similarly to positioning system 350 and is attached to electronic display 490. The attachment may be temporary or permanent. Positioning system 450 uses one or more TOF sensors or modules to determine a location of stylus 410 on a surface of display 490 using the various techniques described herein. Positioning system 450 repeatedly determines the position of stylus 410 on the surface of display 490 as a user of stylus 410 "writes" on the surface of display 490 with stylus 410. The successively captured locations of stylus 410 on display 490 may be communicated to computer 495 as stylus 410 is moved across the surface. In other words, the locations may be transferred from positioning system 450 to computer 495 as they are determined rather than waiting for the writing action to be complete.

Computer 495 processes the information received from positioning system 450 and displays this information in the form of text 444. Although displayed electronically, text 444 is intended to mimic the physical movement of stylus 410 on the surface of display 490 as if stylus 410 was physically marking on the surface of display 490 using traditional methods. Text 444 is illustrated using broken lines for purposes of explanation and for purposes of contrast with text 442. However, text 444 will typically be displayed as continuous lines, to the extent determined by positioning system 450, rather than with broken lines. Text 444 may be displayed in a color that is different than a color of text 442 for purposes of contrast between the existing text and the text the user has added. Adding newly written information to existing information can be very useful for purposes of presentation, instruction, and other types of communication using electronic means.

System 400 enables an electronic display, such as display 490, which does not have touchscreen or electronic whiteboard capabilities, to be adapted to function as if it has a touchscreen. Using the techniques disclosed here, this is accomplished using a low cost attachment, such as positioning system 450. Computer 490 may also store text 444 in a file for later use including adding text 444 to the original file which contained text 442 and/or create a new file that includes both text 442 or text 444. Once computer 495 is configured to display the information received from positioning system 450, in addition to the information typically displayed by computer 450, this electronic whiteboard capability may be used with many different software programs and applications.

Because system 400 detects the movements of stylus 410 using positioning system 450 rather than directly through a surface of display 490, the techniques disclosed here may also benefit from one or more calibration process to ensure that the resulting information displayed on display 490 is closely aligned with the original physical location of stylus 410 on the surface.

In one example of calibration, positioning system 450 and/or computer 495 displays one or more calibration targets or dots on display 490 and the user is requested to touch the target(s) with stylus 410. Information is received from the optical beams by stylus 410 using the techniques described herein to calculate tentative coordinates for the stylus location. If the stylus location does not match the known displayed location of the target on display 490 within a specified tolerance, mathematical corrections are applied to make the calculated location align with the known target location. This process may be performed with two or more targets in different areas of display 490.

Figure 5:
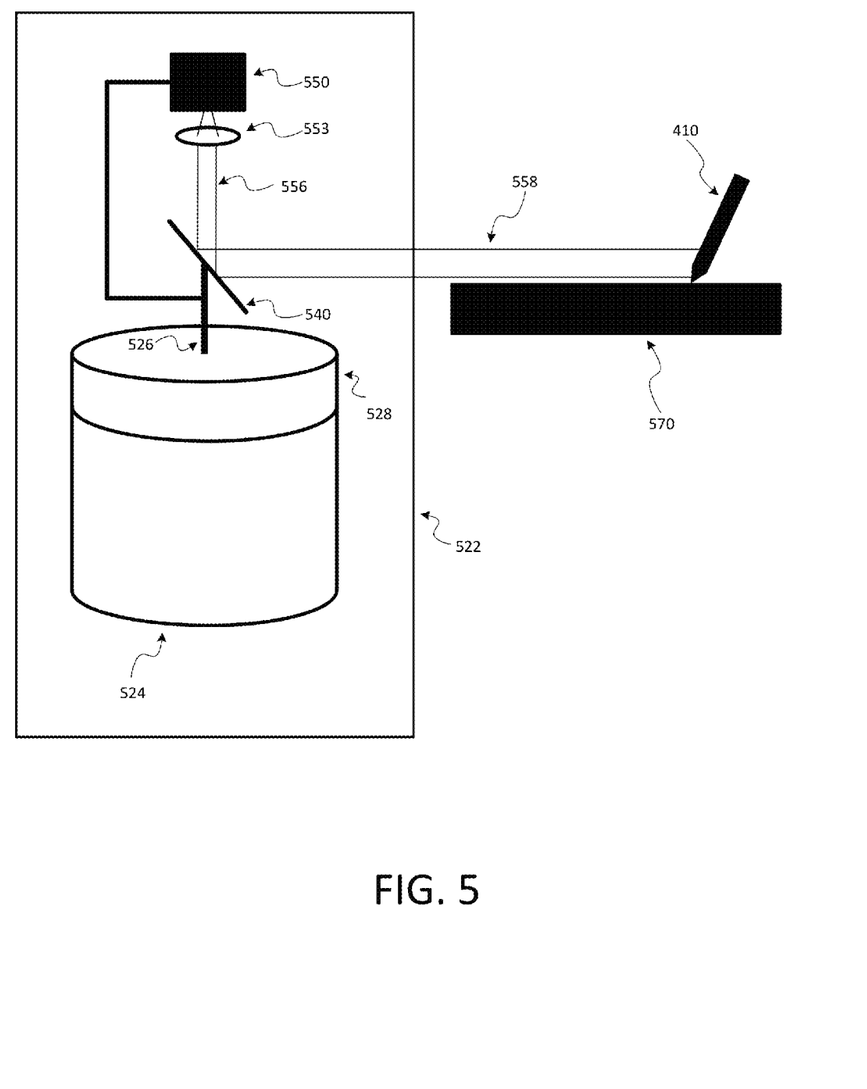
FIG. 5 illustrates an optical detector used in determining a location of an object on a work surface.

FIG. 5 illustrates optical source 522 used in determining a location of stylus 410 on work surface 570. TOF sensor 550 is an example of TOF sensor 122 or TOF module 222, although other types of TOF sensors are possible. TOF sensor 550 may operate in the infrared spectrum, ultraviolet spectrum, and/or the visible light spectrum. Lens 553 may be used to focus, concentrate, collimate, or otherwise change one or more physical characteristics of field of view 556 of TOF sensor 550 to cause field of view 556 to conform to or approximate a desired pattern. Additional and/or other optical elements may also be used.

Mirror 540 is any device for reflecting field of view 556 to form reflected field of view 558. In some cases, mirror 540 may have features that intentionally alter characteristics of field of view 556 to form reflected field of view 558. For example, mirror 540 may have optical characteristics making it more effective for reflecting particular ranges of wavelengths of light, thereby making it a filtering device.

Motor 524 is any type of device or machine for converting electrical energy into rotational mechanical movement. Motor 524 may be a direct current (DC) motor, an alternating current (AC) motor, a stepper motor, a synchronous motor, a hysteresis motor, a reluctance motor, or a combination thereof. Motor 524 may also be another type of electromechanical device that is capable of positioning mirror 540 such as a digital micro mirror device (DMD). In the example of FIG. 5, motor 524 includes shaft 526. Shaft 526 rotates when motor 524 is operated. Therefore, when mirror 540 is attached to rotating shaft 526, field of view 558 is pointed in different directions based on an angle that mirror 540 is mounted on shaft 526 and an angle of rotation of shaft 526. Mirror 540 and motor 524 may be positioned such that reflected field of view 558 is swept parallel, about parallel, substantially parallel to work surface 570 when shaft 526 is rotated by motor 524. TOF sensor 550 may be physically attached to shaft 526 as illustrated in FIG. 5. This configuration enables the orientation of field of view 556 to remain unchanged even though shaft 526 is rotating mirror 540. In other words, by rotating TOF sensor along with shaft 526 the images of objects, such as stylus 410, on surface 570 do not become rotated.

Rotary encoder 528 is an electro-mechanical device that converts the angular position or motion of shaft 526 to analog or digital signals. In some cases, rotary encoder 528 may also be referred to as a shaft encoder. Rotary encoder 528 may be an absolute encoder meaning that the output indicates the actual current position shaft 526 (i.e., an angle indicator). Rotary encoder 528 may also be an incremental encoder or relative encoder meaning that it provides information about the motion of shaft 526 without providing an indication of actual position. Output of an incremental encoder is typically further tracked or processed using other circuitry, such as electrical circuitry 150, to generate information such as shaft speed, shaft position, and/or number of shaft rotations. In some cases, rotary encoder 528 may be integrated into motor 524. Rotary encoder 528 may be useful for operating systems in accordance with the techniques described herein but is optional and may not be included in some implementations.

Information about the speed and/or position of shaft 526 obtained using rotary encoder 528 may assist in determining a location of stylus 410 in a number of ways as described below. A control system controlling the speed of motor 524 may use output from rotary encoder 528 to more accurately control the speed of motor 524 thereby making the relationship between the data sequences received by stylus 410 and the associated angle of reflected optical beam 558 more accurate.

In one example, rotary encoder 528 includes a home position reset feature that provides a signal at least once per revolution that indicates that rotary encoder 528 is at a known physical location. If the orientation between mirror 540 and shaft 526 is known, a home position indication from rotary encoder 528 may be used to perform a home reset function similar to that described above with respect to calibration receiver 240. This enables the timing relationship between the data sequences encoded on reflected optical beam 558 and the angular position of shaft 526 to be reset, adjusted, or corrected at least at every revolution of shaft 526.

In another example, rotary encoder 528 may be an absolute encoder that is able to provide an absolute indication of the angular position of shaft 526, or provide information that can be used to determine an absolute indication of the angular position of shaft 526 without needing to have the shaft rotate past a home indicator or calibration receiver. In this case, the data sequences modulated onto optical beam 556 may be changed or incremented based on the direct, real-time (or near real-time) information about the angular position of shaft 526 as indicated by rotary encoder 528 rather than relying on a predicted or calculated angular position of shaft 526 that relies on an expected rotation speed of motor 524.

In some cases, some or all of the functions of both motor 524 and rotary encoder 528 may be accomplished through use of a stepper motor. A stepper motor is a brushless DC motor that divides a full rotation of the motor into a specified number of equal steps. The motor can be commanded to a specific position without any additional positional feedback mechanism and can be held at that position.

In FIG. 5, the size of optical source 522 and its components are not necessarily illustrated in proportion to stylus 410. Optical source 522 may be depicted in FIG. 5 with relatively larger proportions for purposes of illustration. In fact, the design of optical source 522 may be such that it can be implemented within relatively small dimensions.

Figure 6A:
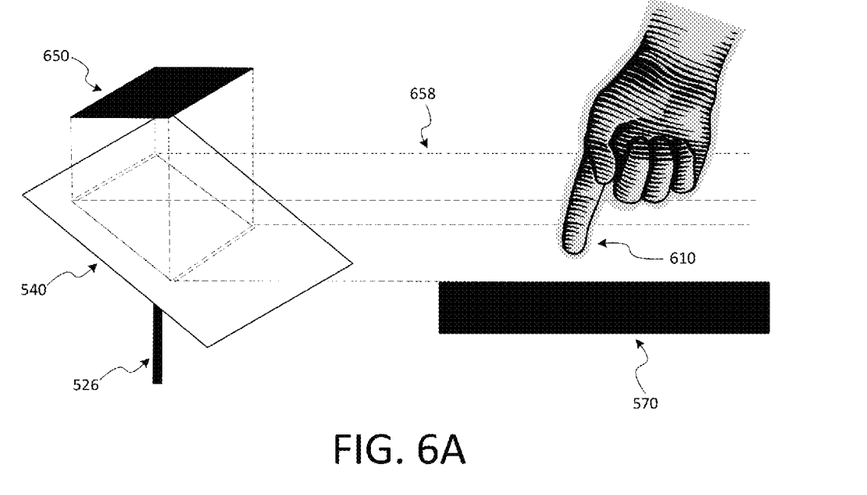
FIG. 6A illustrates a field of view of an area time of flight sensor in accordance with the techniques introduced here.

FIG. 6A illustrates field of view 658 of area TOF sensor 650 in accordance with the techniques introduced here. TOF sensor 650 may be an example of TOF sensor 122, TOF module 222, and/or TOF sensor 550. TOF sensor 650 is an area sensor meaning that it has sensing elements that detect information in two dimensions, forming an area of detection that has both a width and a height. Field of view 658 of TOF sensor 650 is reflected by mirror 540 to form a reflected field of view 658 that covers a corresponding area. As field of view 658 is rotated by mirror 540, TOF images are captured using TOF sensor 650. In FIG. 6A, a user's hand is within field of view 658 of TOF sensor 650 at one or more points during the rotation of mirror 540. However, finger 610 of the hand is not in contact with work surface 570. Therefore, although finger 610 may be captured in one or more images, processing of the images may indicate the lack of contact and "writing" may not be indicated due to the lack of contact.

Figure 6B:
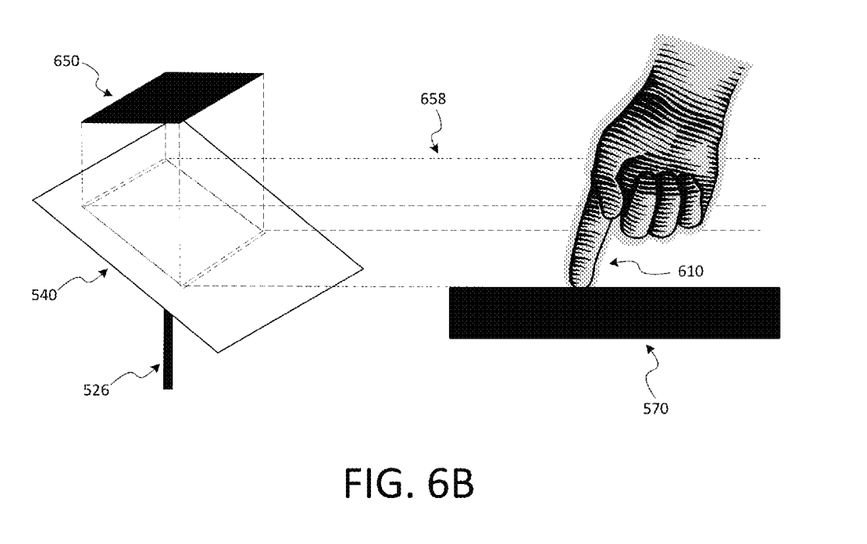
FIG. 6B illustrates a field of view of an area time of flight sensor in accordance with the techniques introduced here.

FIG. 6B illustrates the example of FIG. 6A after finger 610 is in contact with working surface 570. Because field of view 658 includes the surface of work surface 570, the contact between finger 610 and work surface 570 will be captured in one or more images captured by TOF sensor 650 as field of view 658 is rotated across work surface 570. The image(s) are then processed to identify this contact. As discussed previously, the contact may be identified by processing successive images of finger 610 to identify a deformation or change of shape of finger 610 when it is pressed against work surface 570. Alternately, the image(s) may include sufficient optical information to algorithmically determine when there is a gap between finger 610 and work surface 570. In some situations, this may be accomplished when a background color that is within field of view 658 disappears between the tip of finger 610 and work surface 570. Various types of image processing algorithms for making these types of determinations are possible.

Although not illustrated in FIGS. 6A and 6B, various other optical components may be used to change characteristics of field of view of TOF sensor 650. These optical components may be present in the optical path between TOF sensor 650 and mirror 540, in the optical path between mirror 540 and finger 610, or a combination thereof.

In one variation of the examples herein, an alternate method may be used to determine when there is contact between finger 610 and work surface 570. Electrical, electronic, and/or electrostatic methods may be used to determine when finger 610 is in contact with work surface 570 with this information being made available to the system. In other words, the techniques described herein may be used to optically determine the location of a finger or stylus on or near work surface 570 without optically determining whether contact is being made. Then, the electrical, electronic, and/or electrostatic contact information is used in conjunction with the optical information to implement the virtual writing surface. While this approach does require that some type of touch-sensing capability be implemented on work surface 570, this solution can nonetheless be more cost effective than a traditional touchscreen panel because this implementation does not require that the touch-sensing features be capable of detecting or indicating where on work surface 570 contact has been made, it simply requires an indication that contact has been made somewhere on the surface. The location of contact on the surface is still determined optically using the methods described herein.

Figure 7:
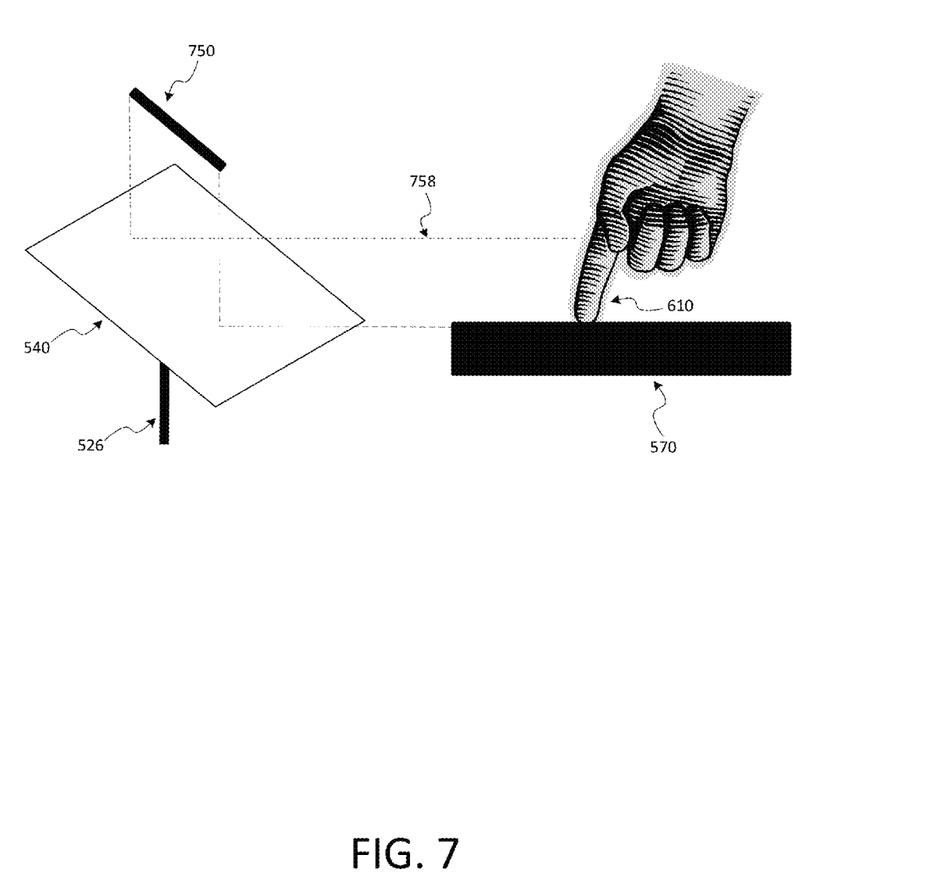
FIG. 7 illustrates a field of view of a linear time of flight sensor in accordance with the techniques introduced here.

FIG. 7 illustrates field of view 758 of linear TOF sensor 750 in accordance with the techniques introduced here. TOF sensor 750 is a linear sensor that includes a row of optical sensing elements rather than a two dimensional array of optical sensing elements. The resulting field of view of TOF sensor 750 is therefore narrower. However, the field of view is still reflected to form reflected field of view 758 in a similar manner. Because field of view 758 is also narrower than previous examples, a larger number of images may need to be taken as field of view 758 is rotated or swept across work surface 570. The term "image" is used herein to include a set of data captured by a linear sensor, such as TOF sensor 750, even though the set of data may not represent a two dimensional image of an area. As described with respect to FIG. 5, TOF sensor 750 may be mechanically configured such that it rotates in conjunction with mirror 540 such that field of view 758 remains perpendicular, or mostly perpendicular, to work surface 570 as it is rotated across work surface 570. This eliminates the extra processing that may be necessary to correct for a rotating field of view.

Figure 8:
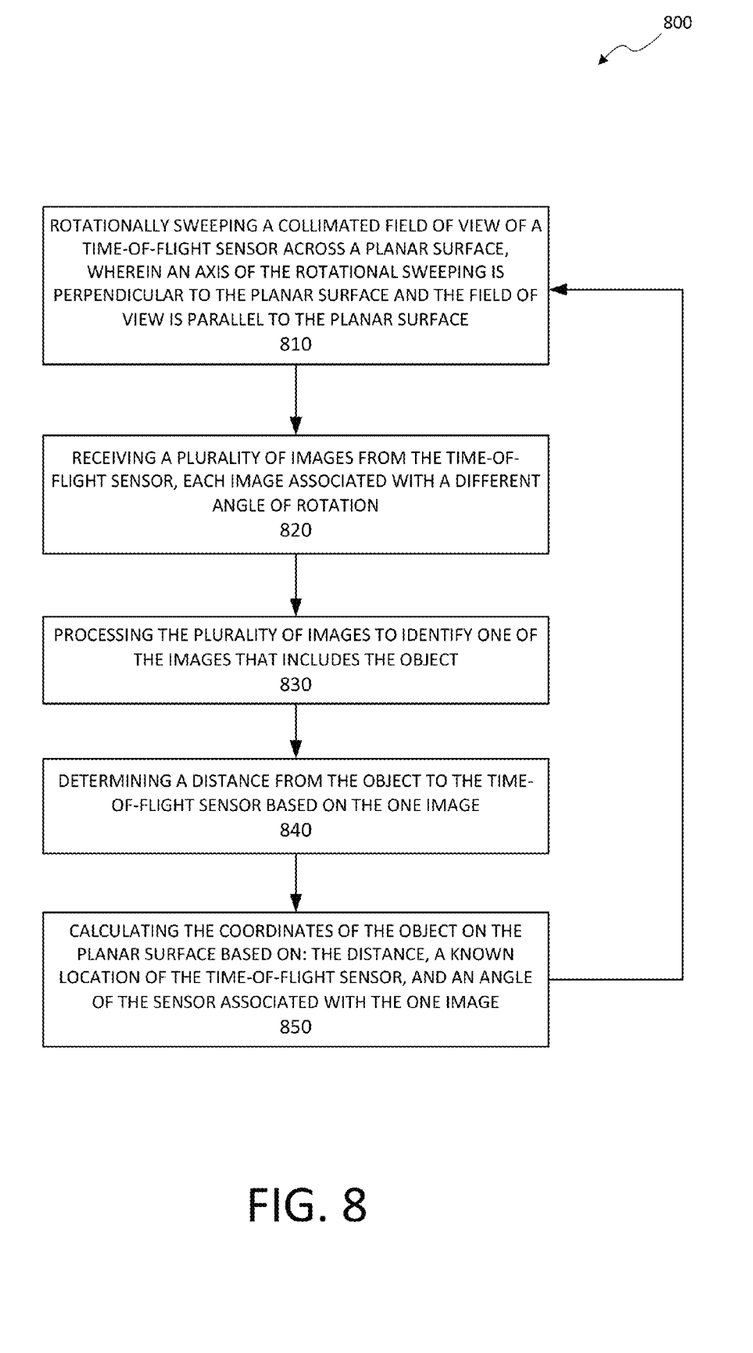
FIG. 8 illustrates a method of operating a system for determining a location of an object on a planar surface.

FIG. 8 illustrates method 800 of operating a system for determining a location of an object on a planar surface. At step 810, method 800 includes rotationally sweeping a collimated field of view of a TOF sensor across the planar surface such that an axis of the rotational sweeping is perpendicular to the planar surface and the field of view is parallel to the planar surface. At step 820, method 800 further includes receiving a plurality of images from the TOF sensor where each image is associated with a different angle of rotation. At step 830, method 800 includes processing the plurality of images to identify one of the images that includes the object. At step 840, the method includes determining a distance from the object to the TOF sensor based on the one image. Finally, at step 850, method 800 includes calculating the coordinates of the object on the planar surface based on the distance, a known location of the TOF sensor, and an angle of the sensor associated with the one image. Many variations of this method are possible as described in the other examples provided herein.

Figure 9:
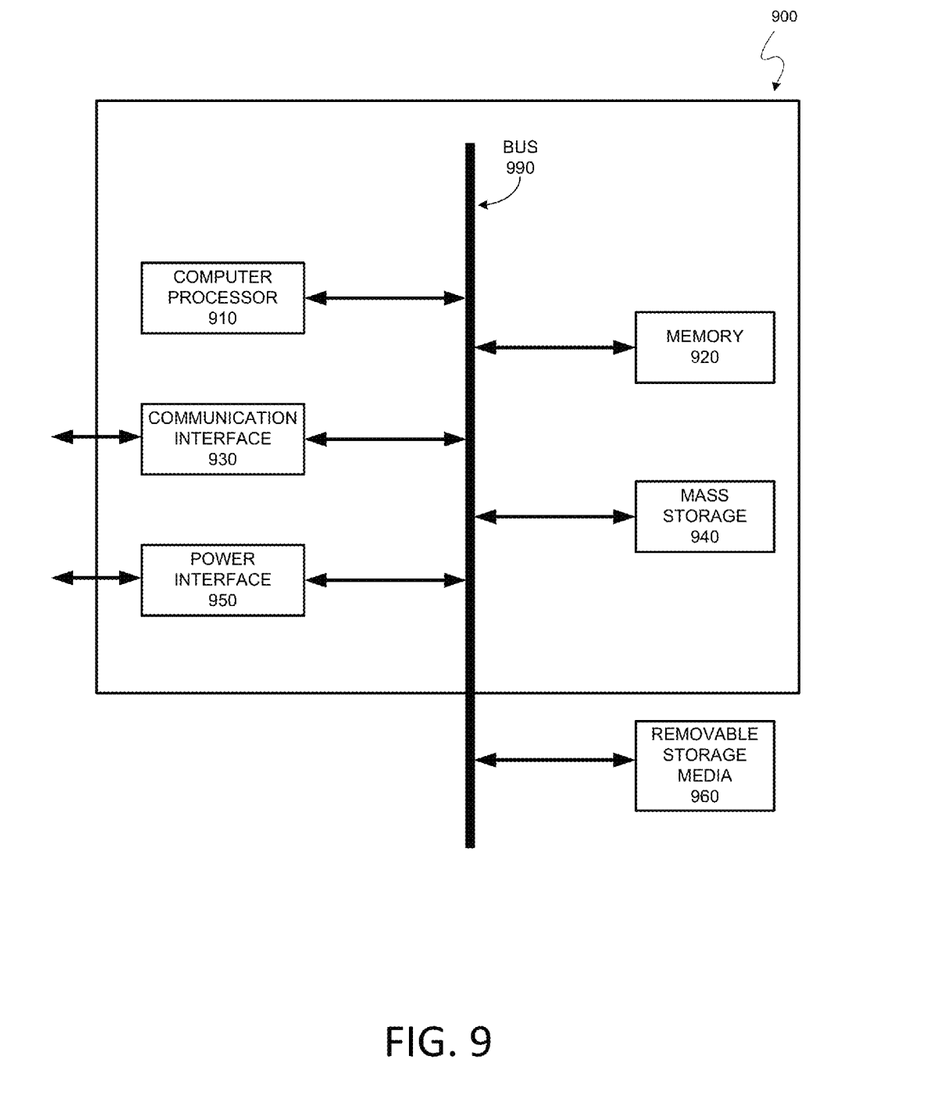
FIG. 9 illustrates a computing system that may be used in determining a location of a stylus on a planar surface.

FIG. 9 illustrates computer system 900 with which some embodiments of the techniques disclosed herein may be utilized. A computing system, such as computing system 900, may be used in or implemented in the form of electrical circuitry 150, positioning module 350, positioning system 450, and/or computer 495.

According to the example of FIG. 9, computer system 900 includes a bus 990, at least one computer processor 910, at least one communication interface 930, at least one memory 920, at least one mass storage 940, and at least one power interface 950. A removable storage media 960 also interface to bus 990 of computer system 900.

Computer processor 910 can be any known computer processor, central processing unit, microprocessor, microcontroller, programmable logic array, or programmable logic device. Computer processor 910 may also interface to a coprocessor.

Communication interface 930 can be any type of interface for communicating with another device or a network. Communication interface 930 may be configured for communicating using a wired connection, a wireless connection, audio signals, light waves, infrared, or a combination thereof. Communication interface 930 may be configured for communicating with or over a network such a Local Area Network (LAN), Wide Area Network (WAN), or any network to which computer system 900 connects. Communication interface 930 may also be configured to communicate with an electronic device such as a cellular phone, a smartphone, a tablet, a laptop computer, a server, or a digital audio device. The various functions of communication interface 930 may be distributed across multiple communication interfaces. In one example, communication interface 930 is a USB interface.

Memory 920 can include random access memory (RAM), or any other type of dynamic data storage device commonly known in the art. Memory 920 may also include one or more static storage devices such as read only memory (ROM), programmable read only memory (PROM), flash memory, magnetic memory, erasable programmable read only memory (EPROM), and/or electrically erasable programmable read only memory (EEPROM) for storing static data such as firmware or machine-executable instructions for computer processor 910 or for another computer processor.

Mass storage 940 can include one or more persistent mass data storage devices or modules that may be used to store data, information, and/or instructions. Mass storage 940 may include a hard drive, a tape drive, an optical drive, flash memory, a micro electromechanical storage device, or a combination thereof.

Power interface 950 can be any type of interface for receiving and/or transmitting electrical power. The functions of power interface 950 may be spread across multiple power interfaces. The functions of power interface 950 may also be combined into a single connector and/or interface with communication interface 930. For example, the functions of communication interface 930 and power interface 950 may both be implemented in the form of one or more USB interfaces.

Removable storage media 960 can be any kind of external data storage device including a hard drive, a memory card, a subscriber identity module (SIM) card, flash memory, an optical drive, a tape drive, a micro electromechanical storage device, or a combination thereof.

Bus 990 communicatively couples the elements of computer system 900, as well as removable storage media 960. Bus 990 may conform to an industry standard bus architecture and protocol or may use a proprietary architecture and/or protocol.

Some or all of the steps and operations associated with the techniques introduced here may be performed by hardware components or may be embodied in machine-executable instructions that cause a general purpose or special purpose computer processor programmed with the instructions to perform the steps. Alternatively, the steps may be performed by a combination of hardware, software, and/or firmware.

The systems, methods, and components described above are meant to exemplify some types of possibilities. In no way should the aforementioned examples limit the scope of the invention, as they are only exemplary embodiments.

The foregoing disclosure has been presented for purposes of illustration and description. Other modifications and variations may be possible in view of the above teachings. The examples described in the foregoing disclosure were chosen to explain the principles of the concept and its practical application to enable others skilled in the art to best utilize the invention. It is intended that the claims be construed to include other alternative embodiments of the invention except as limited by the prior art.

The phrases "in some embodiments," "according to some embodiments," "in the embodiments shown," "in other embodiments," "in some examples," "in some cases," "in some situations," "in one configuration," "in another configuration" and the like generally mean that the particular feature, structure, or characteristic following the phrase is included in at least one embodiment of the present invention and/or may be included in more than one embodiment of the present invention. In addition, such phrases do not necessarily refer to the same embodiments or different embodiments.

What is claimed is:

1. A system for determining a location of a stylus on a planar surface, the system comprising:
    a time-of-flight sensor having multiple sensing elements that provide a field of view for the time-of-flight sensor;
    a motor having a rotating shaft;
    a mirror attached to the shaft for reflecting the field of view of the time-of-flight sensor across the planar surface, the reflected field of view being about parallel to the planar surface and sweeping the reflected view across the planar surface when the shaft is rotated;
    a stylus having a pressure sensitive tip, a switch, and a wireless transmitter, the stylus configured to transmit a wireless signal from the wireless transmitter when the switch is an on position and the pressure sensitive tip is pressed against the planar surface, the wireless signal including writing pressure information detected from the pressure sensitive tip; and
    electrical circuitry configured to:
        receive a plurality of range images from the time-of-flight sensor as the field of view is swept across the planar surface, wherein each range image includes information indicating detected distances associated with content of the range image;
        process the plurality of range images to identify at least one of the range images that includes the stylus;
        calculate a location of the stylus on the planar surface relative to the motor based on an angle of the shaft associated with the at least one range image and a distance of the stylus from the time-of-flight sensor indicated in the at least one range image;
        receive the transmitted wireless signal from the stylus; and
        transmit the calculated location of the stylus and the writing pressure information to a display system.

2. The system of claim 1 wherein the motor is a stepper motor.

3. The system of claim 1 wherein the time-of-flight sensor is a linear sensor having the multiple sensing elements configured in a linear arrangement such that the reflected field of view of the linear sensor is about perpendicular to the planar surface for a plurality of rotational angles of the shaft of the motor.

4. The system of claim 3 wherein the linear sensor is attached to the shaft of the motor and rotates with the shaft of the motor to maintain the perpendicular relationship between the reflected field of view and the planar surface for the plurality of rotational angles.

5. The system of claim 1 wherein the time-of-flight sensor is an area sensor.

6. The system of claim 1 wherein the time-of-flight sensor is a time-of-flight camera.

7. The system of claim 1 wherein the wireless signal comprises infrared light.

8. The system of claim 1 further comprising a lens to collimate the reflected field of view.

9. The system of claim 1 further comprising a calibration marker at a fixed calibration position, the electrical circuitry further configured to process the plurality of range images to determine when the mirror is pointed at the calibration marker and determine the angle of the shaft based on the calibration position.

10. The system of claim 1 further comprising a rotary encoder attached to the shaft of the motor, the electrical circuitry further configured to calibrate the angle of the shaft based on information obtained from the rotary encoder.

11. A method of determining coordinates of a stylus on a planar surface, the method comprising:
    rotationally sweeping a collimated field of view of a time-of-flight sensor across the planar surface, wherein an axis of the rotational sweeping is perpendicular to the planar surface and the field of view is parallel to the planar surface;
    receiving a plurality of images from the time-of-flight sensor, each image associated with a different angle of rotation;
    processing the plurality of images to identify one of the images that includes the stylus;
    determining a distance from the stylus to the time-of-flight sensor based on the one image;
    receiving a wireless signal from the stylus indicating that the stylus is being pressed against the planar surface, the wireless signal further indicating a pressure with which the stylus is being pressed against the planar surface as determined by a pressure sensitive tip of the stylus;
    calculating the coordinates of the stylus on the planar surface based on: the distance, a known location of the time-of-flight sensor, and an angle of the sensor associated with the one image; and
    transmitting the coordinates and the pressure to a display system.

12. The method of claim 11 wherein the time-of-flight sensor is a linear sensor or an area sensor.

13. A system for providing input to an electronic display, the system comprising:
    a stylus having a pressure sensitive tip, a switch, and a wireless transmitter, the stylus configured to transmit a wireless signal from the wireless transmitter when the switch is an on position and when the pressure sensitive tip is pressed against a surface of the electronic display, the wireless signal including writing pressure information detected using the pressure sensitive tip of the stylus; and
    a detection unit removably attached to the electronic display, the detection unit including:
        a time-of-flight camera having a collimated field of view;
        a motor for rotating the field of view across the surface of the electronic display;
        one or more computer processors configured to:
            rotate the field of view across the surface of the electronic display, the field of view being about parallel to the surface;
            receive a plurality of images from the time-of-flight camera, the plurality of images being associated with different angles of rotation;
            process the plurality of images to identify at least one of the images that includes the stylus;
            calculate a location of the stylus on the surface relative to the location of the motor based on an angle of the motor associated with the one image and based on a distance of the stylus from the time-of-flight camera as indicated in the one image; and transmit the calculated location for display on the electronic display.

14. The system of claim 1 wherein the wireless signal comprises radio frequency signals.

15. The system of claim 13 wherein the wireless signal comprises radio frequency signals.

16. The system of claim 13 wherein the wireless signal comprises infrared light.

* * * * *